UNITED STATES PATENT OFFICE 2,494,191

STARCH DEGRADATION PROCESS

Salomon Neumann, London, England

No Drawing. Application June 14, 1945, Serial No. 599,521. In Great Britain June 28, 1944

3 Claims. (Cl. 127—33)

This invention relates to the manufacture of degradation products of starch such as soluble starch, dextrine, British gums and glucose-containing materials and adhesives.

It is known to heat starch with or without chemicals to convert it into various types of dextrines and British gums and also to treat starch with chlorinating agents to produce the so-called soluble starches. It is further well-known to convert starch into glucose by means of a treatment with an acid such as sulphuric acid and water or by means of an enzyme such as diastase.

In the production of dextrines and British gums the starch or starch-containing material, which usually has a moisture content of 10 to 25%, is mixed with the chemicals employed and dried. The material is then roasted in mixing pans whilst being thoroughly mixed. According to the amount and nature of the chemicals employed, the temperature and the time of treatment, different degradation products of starch are obtained. This is a lengthy process especially when highly degraded products are required. The heating is usually effected by means of steam, hot air, or by the use of heated liquids such as oil.

The process has the disadvantages that a fairly long time is required and since the products are not heated uniformly during the roasting a mixture of products is obtained. Furthermore, the lengthy heating, especially when a high temperature is employed, causes the product to be of a dark colour or even to be partly burnt.

According to the present invention a process is provided for the manufacture of degradation products of starch wherein starch or a starch-containing material such as flours, dry or in the presence of a small proportion of water, with or without the addition of chemicals such as an acid or a chlorinating agent, alkaline-reacting substances and salts, and in the presence or absence of an enzyme such as diastase is subjected to dielectric heating at high frequencies between the plates of a condenser.

The term "high frequencies" as used herein refers to frequencies greater than 100,000 and includes radio frequencies.

If the heating is effected at a temperature of below 100° C. in the presence of an acid such as sulphuric acid or an enzyme such as diastase in the presence of from 10 to 35% by weight of water, a glucose-containing material is obtained. Under the same temperature and water content conditions a so-called swelling starch is obtained, if the heating is effected in the absence of an acid or enzyme or in the presence of only a small proportion of an acid or an enzyme or in the presence of alkaline-reacting substances or salts.

At a temperature of between 100 and 130° C. in the presence of an acid or a chlorinating agent, a soluble starch is obtained, and by heating between 130 and 200° C., a dextrine or British gum is obtained.

If water is present it leads to swelling in the early stages of the treatment and the products obtained therefore swell in cold water, and by chemical degradation products soluble in cold water are obtained.

The present invention also provides a process for the manufacture of degradation products of starch which are soluble in cold water wherein degradation products of starch which are normally insoluble in cold water such as soluble starch or white dextrine in the presence of small proportions of water, e. g. up to 35% by weight, are subjected to dielectric heating at high frequencies between the plates of a condenser.

The temperature employed for the heating may be, for example, between 50 and 100° C.

The present invention further provides a process for the treatment of cold water-soluble dextrine wherein the cold water-soluble dextrine in the presence of up to 25% by weight of water is subjected to dielectric heating at high frequencies between the plates of a condenser so that the particles flux together and a product is obtained which dissolves in water without forming lumps.

The processes of the present invention for the manufacture of degradation products of starch which are insoluble in cold water and for the treatment of cold water-soluble dextrine may be combined with the process of the present invention for the manufacture of degradation products of starch from starch or starch-containing materials.

The processes of the present invention may in some cases be carried out with advantage under increased pressure or under vacuum. It may sometimes be advantageous to commence the process under vacuum and to apply increased pressure in the later stages, or vice versa.

The processes of the present invention may be carried out with the material under treatment contained in a vessel but preferably the material is disposed on a travelling band so that the process is thereby rendered continuous. In either case there is the advantage that no stirring is required as in the usual processes.

The processes of the present invention have the advantage that they are very rapid even when highly degraded products are obtained and that these products are substantially uniform owing to each particle receiving substantially the same quantity of heat, which is of particular importance for use in the textile industry.

The products produced according to the present invention are useful as foodstuffs, e. g. pudding starches, glucose-containing material, or for the manufacture of pastes or as cold water adhesives and their nature can be altered as desired by treatment with acids, salts or alkalies either before or after the dielectric heating.

The term "starch-containing material" as used in the appended claims includes starch itself.

I claim:

1. In a process for the manufacture of degradation products of starch by subjecting a material containing unswollen starch in the presence of up to 25% by weight of water to heating between 100 and 200° C., the step of effecting the heating by means of dielectric heating at high frequency between the plates of a condenser.

2. In a process for the manufacture of degradation products of starch by subjecting a material containing unswollen starch in the presence of up to 25% by weight of water and in the presence of an acid converting agent to heating between 100 and 200° C., the step of effecting the heating by means of dielectric heating at high frequency between the plates of a condenser.

3. In a process for the manufacture of degradation products of starch by subjecting a material containing unswollen starch in the presence of up to 25% by weight of water and in the presence of a chlorinating agent for the starch to heating between 100 and 130° C., the step of effecting the heating by means of dielectric heating at high frequency between the plates of a condenser.

SALOMON NEUMANN.

REFERENCES CITED

The following references are of record in the file of this patent:

UNITED STATES PATENTS

| Number | Name | Date |
| --- | --- | --- |
| 1,110,754 | Duryea | Sept. 15, 1914 |
| 1,900,573 | McArthur | Mar. 7, 1933 |
| 2,156,488 | Bode | May 2, 1939 |

OTHER REFERENCES

Radley, "Starch and Its Derivatives," 2nd ed., N. Y., 1944, pages 244 and 245.

Kerr, "Chem. and Ind. of Starch," N. Y., 1944, page 251.

Robertson, "Radio Power for Processing Chemical Materials," I. and Eng. Chem., 36, No. 5, pages 440–447. (May 1944.)

Eynon and Lane, "Starch," Heffer & Sons, Ltd., 1928, pages 71, 72.

Loeb, Biochem. Z., 46, 121–124 (1912), C. A., 7, 476; Biochem. Z., 27 I, 530–1 (1914), C. A. 9, 231; Biochem. Z., 69, 1–38 (1915), C. A. 9, 1490.